United States Patent [19]

Parsons et al.

[11] 4,010,924
[45] Mar. 8, 1977

[54] ATTACHMENT FOR BRICKWORK

[75] Inventors: David Charles Parsons; Wendy Anne Parsons, both of Much Hadham; Norman Brian Pigott, Bishops Stortford; Alan Ernest Foster, Sawbridgeworth, all of England

[73] Assignee: S.S.B. (Aerial Fixings) Limited, England

[22] Filed: Sept. 4, 1975

[21] Appl. No.: 610,288

[30] Foreign Application Priority Data

Sept. 9, 1974 United Kingdom ............ 39318/74
June 5, 1975 United Kingdom ............ 24315/75

[52] U.S. Cl. .................. 248/225.3; 24/263 LS; 248/228

[51] Int. Cl.² .................. E04H 17/14; H02B 1/04; F16M 1/00

[58] Field of Search ....... 248/226 R, 226 B, 226 C, 248/43, 226 D, 228, 316 R, 316 A; 24/263 LS, 263 A, 248 BC, 248 SA, 278

[56] References Cited

UNITED STATES PATENTS

| | | | |
|---|---|---|---|
| 1,049,968 | 1/1913 | Allen | 24/278 |
| 1,691,864 | 11/1928 | Wicke | 248/226 B X |
| 1,745,814 | 2/1930 | Sadler | 248/43 |
| 2,057,980 | 10/1936 | Ringzelli | 248/226 C X |
| 3,131,927 | 5/1964 | Penix | 24/263 A X |

FOREIGN PATENTS OR APPLICATIONS

| | | | |
|---|---|---|---|
| 758,745 | 5/1967 | Canada | 24/278 |
| 376,228 | 3/1922 | Germany | 248/226 R |
| 354,700 | 2/1930 | United Kingdom | 248/226 R |

*Primary Examiner*—J. Franklin Foss
*Attorney, Agent, or Firm*—Stevens, Davis, Miller & Mosher

[57] ABSTRACT

An attachment for a building structure comprises a securing means shaped to locate on a corner of a structure. Two arms are supported by the securing means so as to extend divergently to locate along adjacent faces of the structure to opposite sides of the corner. The arms are provided with engagement portions at their remote ends for engagement into a respective one of the adjacent faces of the structure. A single adjustment means is arranged to effect sliding of the arms along the adjacent faces towards the corner to urge the engagement portions into clamping engagement with the structure.

12 Claims, 9 Drawing Figures

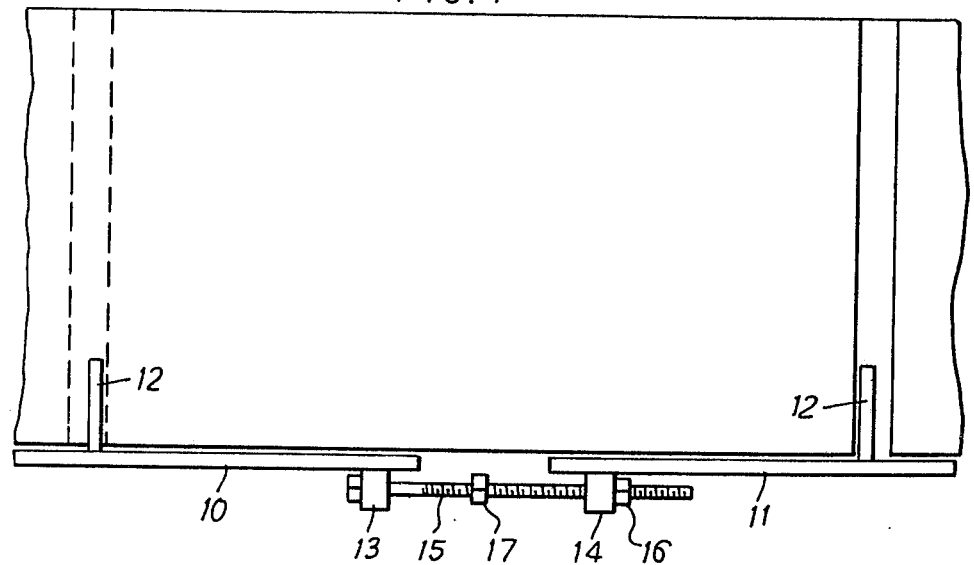
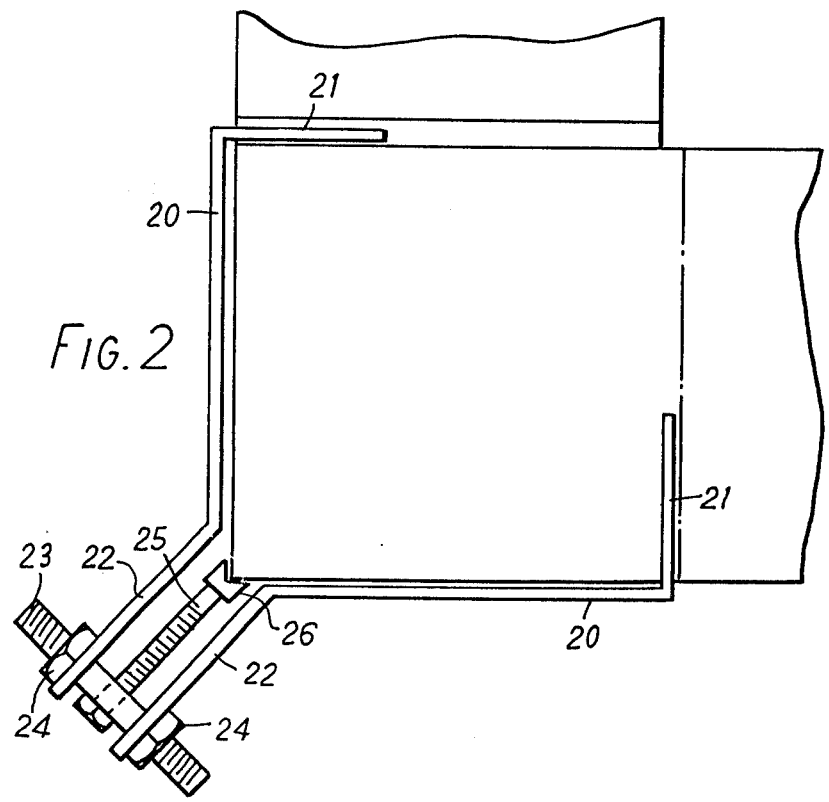

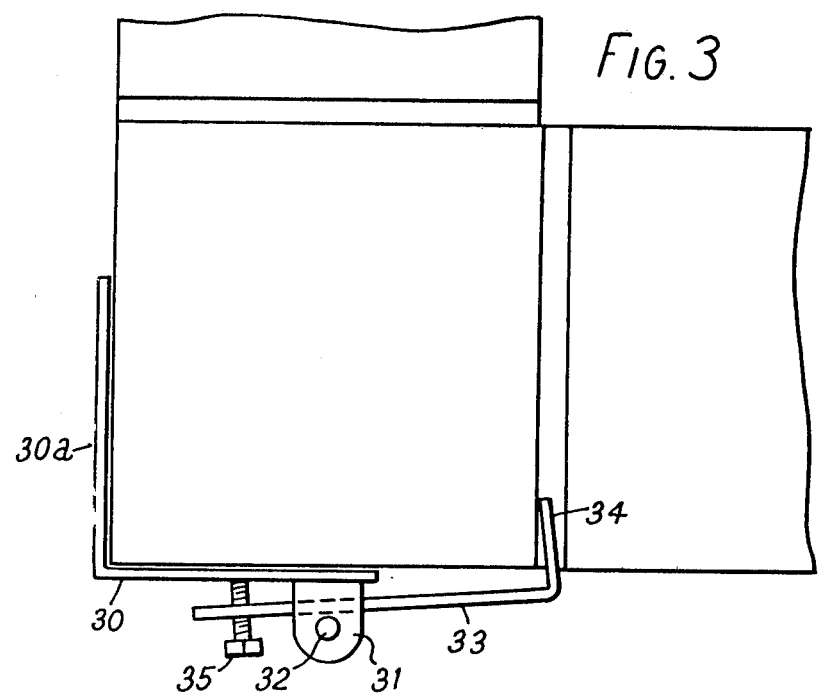
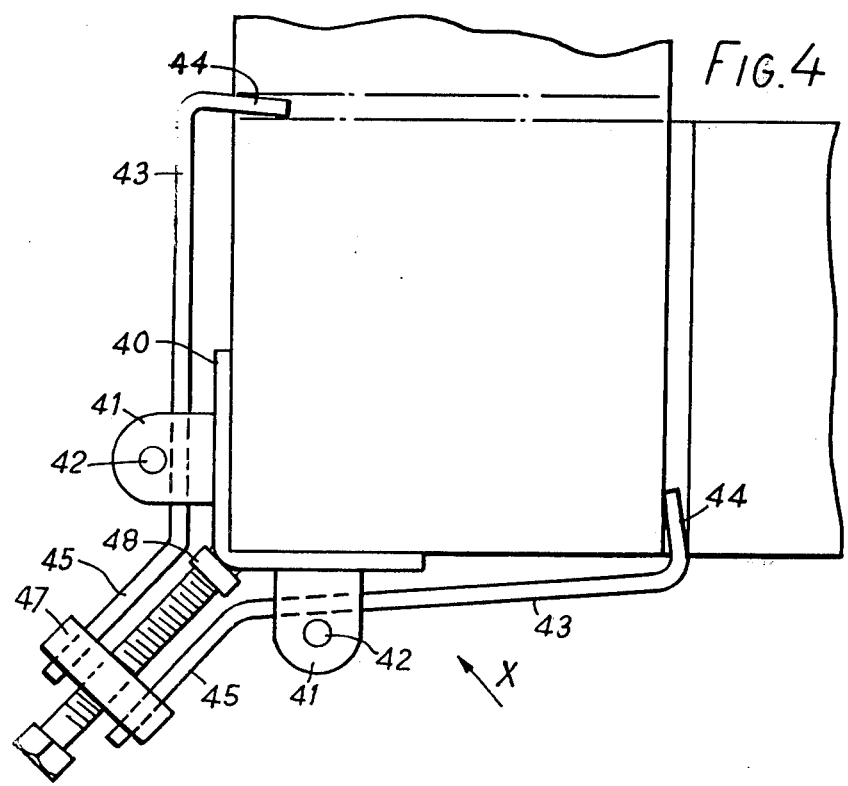

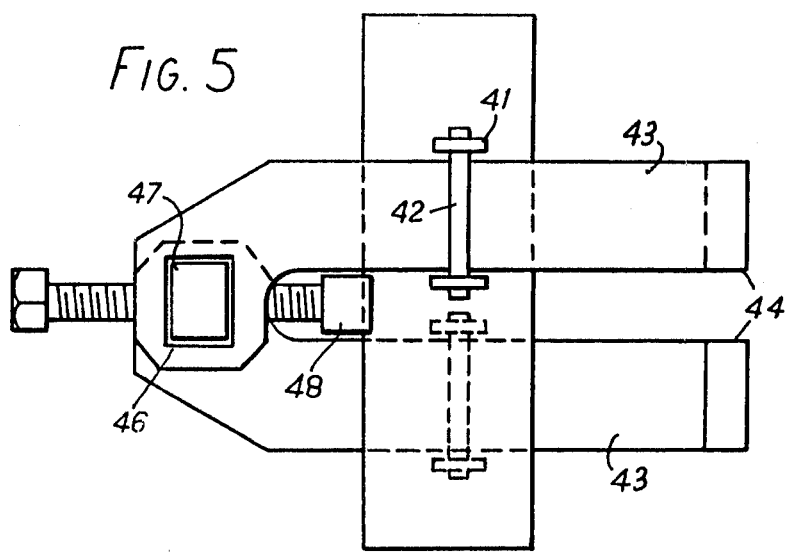
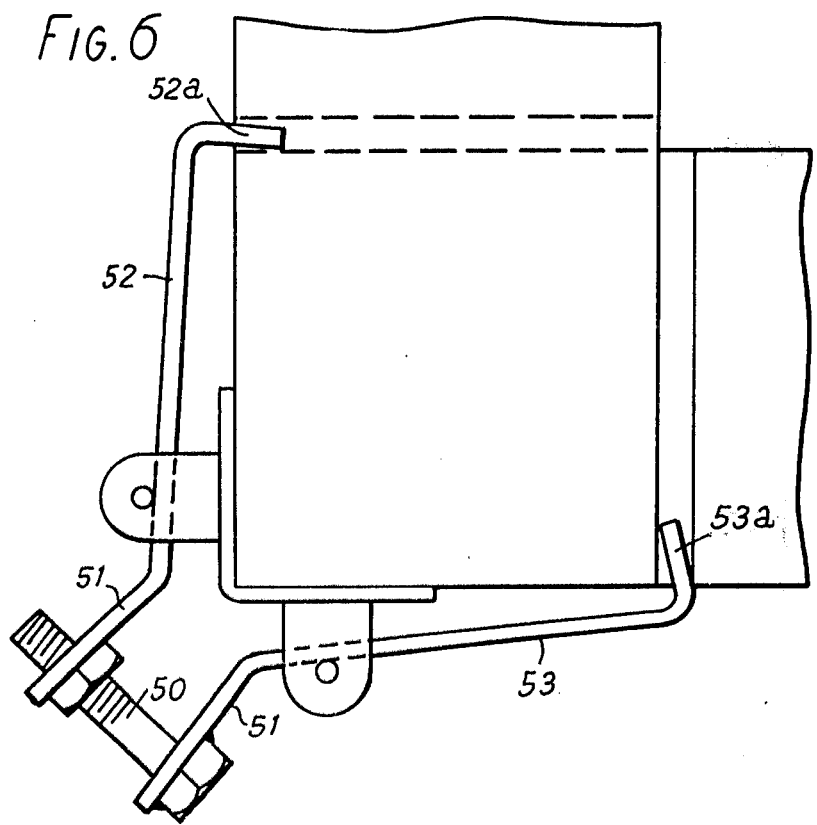

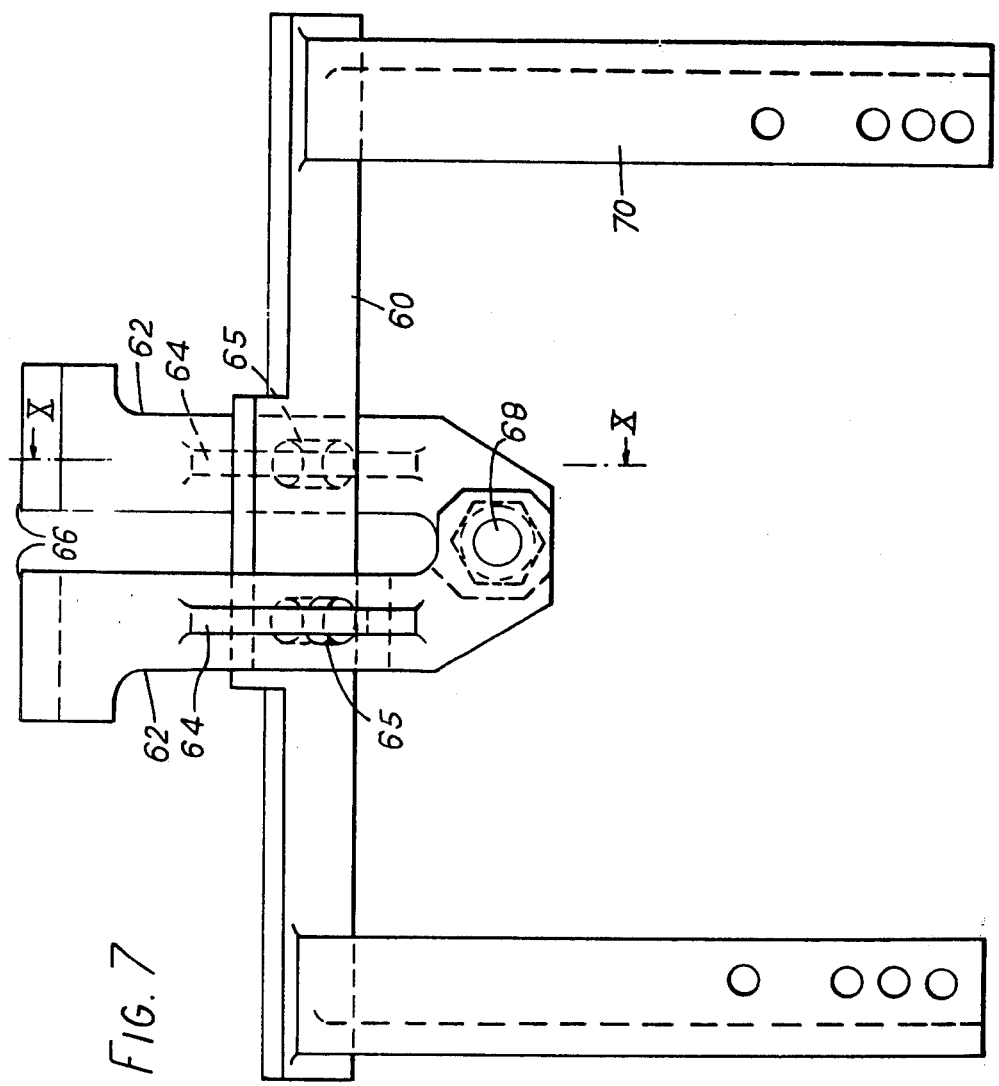

ATTACHMENT FOR BRICKWORK

BACKGROUND OF THE INVENTION

This invention relates to attachments for securement on a building structure.

The task of mounting external structures e.g. television aerials onto building structures is an awkward and time consuming one. Normally such structures are secured, to a structure face by the following steps: drilling the wall, plugging the holes and securing the structure into the plugs; or to a column structure e.g. a chimney by means of a band which is wrapped round the column and over or through part of the structure the band being subsequently tightened. Each of these techniques is particularly difficult when working under conditions of restricted movement e.g. at the top of a ladder.

The invention has been devised with the intention of alleviating at least some of the difficulties.

According to the invention there is provided an attachment for a building structure comprising securing means shaped to locate on a corner of a structure, two arms supported by the securing means so as to extend divergently to permit location of the arms along adjacent faces of the structure to opposite sides of the corner, engagement portions at remote ends of the arms for engagement into a respective one of said adjacent faces of the structure and a single adjustment means operatively coupled with the arms and operable to effect sliding of the arms along said adjacent faces towards the corner to urge said engagement portion into clamping engagement with the structure.

Locating means may be provided on the securing means to slidably locate the arms and to permit sliding of the arms along the adjacent faces of the structure.

The locating means may comprise for each arm a retaining member spaced from and coupled with the securing member and adapted to permit slidable mounting of a respective one of said arms between the retaining member and a securing member.

In a preferred form the retaining member is arranged as a fulcrum for the arms whereby said single adjustment means is operable to effect both sliding of the arms along said adjacent faces and rocking of the arms on the fulcrums to urge said engagement portions inwardly of the structure.

The retaining members may each comprise a rod secured between supports extending from the securing means.

In one form the adjustment is arranged by adapting the ends of the arms opposite to said remote ends such that when supported by the securing means they extend into oppositely facing dispositions and, said adjustment means comprises an extensible adjustment device connected between said ends opposite the remote ends.

In an alternative arrangement the adjustment means comprises an extensible adjustment device coupled between said securing means and each of said arms at opposite ends of the arms to said remote ends whereby extension of said adjustment device effects the sliding of said arms towards the corner.

The securing member may be substantially "L" shaped and the engagement portions may be adapted to be relatively vertically offset when supported by the securing means on the corner of a structure.

In one particularly advantageous form the invention comprises securing means shaped to locate on the corner of a structure two rods positioned one to each side of the corner engagement of the securing means and secured between supports extending from the securing means, two arms each slidably mounted between a respective one of said rods and the securing means in divergent disposition to permit location of the arms along adjacent faces of a structure to opposite sides of a corner, said arms being provided with engagement portions at remote ends of the arms for engagement into a respective one of the adjacent faces and having their opposite ends extending into oppositely facing disposition, a cross member in sliding engagement with the arms between said opposite ends and a screw cooperating with a threaded hole in the cross member and extending in engagement between the cross member and the securing means to permit sliding and rocking of the arms on the rods by adjustment of the screw to urge the engagement portions into clamping engagement with the structure.

BRIEF DESCRIPTION OF THE DRAWINGS

In order that the invention and its various other features may be understood more easily, embodiments thereof will now be described, by way of example only, with reference to the drawings, wherein:

FIG. 1 is a simple face mounting attachment for brickwork which attachment is constructed in accordance with the invention;

FIG. 2 is a simple corner mounting attachment constructed in accordance with the invention;

FIG. 3 is a corner or face mounting attachment constructed in accordance with the invention in which one arm is rockably mounted on the other arm;

FIG. 4 is a corner mounting attachment constructed in accordance with the invention;

FIG. 5 is a view in the direction of the arrow X shown in FIG. 4, but with the attachment separate from the wall;

FIG. 6 is a further corner mounting attachment constructed in accordance with the invention;

FIG. 7 is yet another corner mounting attachment constructed in accordance with the invention;

DETAILED DESCRIPTION OF THE ILLUSTRATED EMBODIMENTS

Figure 8:
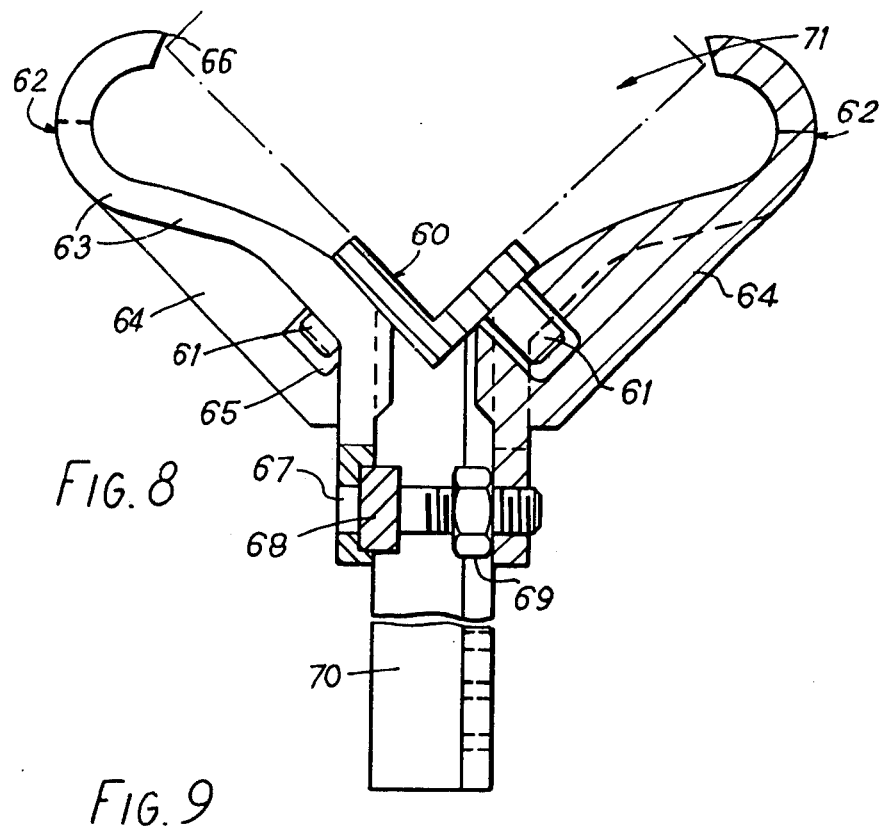
FIG. 8 is a cross sectional view on the line $x - x$ of the attachment shown in FIG. 7 showing how it locates on a brick structure.

The attachment of FIG. 1 comprises first and second arms 10 and 11 respectively formed of steel plates of strip form. Each arm has a plate 12 welded thereto and projecting substantially at right angles and extending transversely of the strip. The plates 12 form engagement portions which can be hammered into mortar crevices between bricks as can be seen in the drawing. On the sides of the strips opposite to the plates 12 blocks 13 and 14 are welded and these are provided with through bores for receiving a bolt 15. The bolt 15 is welded to the block 13 and is a clearance fit in the bore on the block 14. The arm 11 is retained on the bolt 15 by means of a nut 16 and a further nut 17 is mounted on the bolt between the blocks.

As can be seen in the drawing, after hammering the arms such that the plates project into the brickwork such that brickwork extends therebetween, the nut 16 can be tightened to urge the arms and hence the plates 12 relatively towards each other into clamping engagement with the brickwork therebetween to secure the attachment on the brickwork. Alternatively, the nut 17 can be loosened and the nut 17 secured into engagement with the block 14 to urge the arms and hence the plates 12 relatively away from each other into engagement with the bricks at the opposite side of the crevice to secure the attachment on the brickwork.

In the drawing of FIG. 2 two arms 20 are again formed of steel plates of strip form. Their ends 21 are bent substantially at right angles to the strip to form engagement portions which can be hammered into mortar crevices of two brickwork faces situated on opposite sides of a corner. In this position the opposite ends 22, which are cranked, face each other but are spaced apart. Bores are provided in the two ends 22 to receive a threaded rod 23 which is a clearance fit therein and two nuts 24 can be tightened to prevent the ends 22 from moving apart. The rod 23 is provided with a threaded transverse through bore intermediate its ends through which a bolt 25 can be screwed towards the corner of the brickwork. A corner clamp 26 formed by a block shape to locate on the corner has a blind bore for receiving the end of the bolt. The clamp 26 is urged into contact with the corner of the brickwork by adjustment of the bolt 25 and serves to pull the arms along the brickwork faces so that the ends 21 are urged into clamping engagement with brickwork extending therebetween. In the absence of distortion of the arms there will be no relative movement of the ends 21. The clamp 26 can be arranged to be captively and pivotally mounted on the end of the bolt 25.

In the arrangement shown in FIG. 3 a first arm 30 of "L" shaped cross section steel plate has an engagement portion 30a. The arm is provided with two punched or welded on spaced projections 31 which serve to support opposite ends of a rod 32 such that it is spaced from the arm 30. A second arm 33 of strip form steel plate is slideably locatable between the rod 32 and the arm 30 as can be seen readily on the drawing. One end 34 of the arm 33 is cranked to form an engagement portion and this and the arm 30 can be hammered into spaced mortar crevices in a brickwork structure. The opposite end of the arm is provided with a threaded through-bore through which a bolt can be screwed into engagement with the first arm 30. This causes the arm 33 to rock on the rod 32 which acts as a fulcrum so that the end 34 is urged into clamping engagement with the brickwork. Clearly this arrangement is also suitable for mounting at the corner of a structure with the arm 30 on the corner and the end 34 of the other arm in engagement with a mortor crevice in one face.

FIGS. 4 and 5 show a particularly advantageous arrangement for mounting on the corner of a brick structure and is similar to FIG. 3, but has two similar arms mounted on a securing member. The securing member 40 is shaped to locate on the corner and in this particular illustration is of L-shaped cross section steel plate. The securing member is provided on each external face with two punches or welded on spaced projections 41 which serve to support opposite ends of a respective rod 42 such that it is spaced from the securing member 40. Two arms 43 of strip form steel plate are slideably locatable one between each rod 42 and the securing member 40 as can be seen readily in the drawing. One end 44 of each arm is cranked to form an engagement portion and these portions can be hammered into spaced mortar crevices on faces of the brickwork to opposite sides of a corner when the securing member and arms are located on the corner. The opposite ends 45 of the arms are cranked and face each other and are provided with a square hole 46 therethrough for receiving a square peg 47 which is a sliding fit therethrough. The peg 47 is provided with a threaded transverse through bore through which a bolt can be screwed into engagement with a collar 48 welded onto the corner of the securing member 40. This causes the arms 43 to rock on their respective rod 42 which acts as a fulcrum so that the end 44 is urged into clamping engagement with the brickwork.

As can be seen in FIG. 5 the arms 43 are arranged such that in this preferred arrangement they are relatively offset so as to engage in crevices in different courses of brickwork. The offset is preferably equal to the depth of one brick.

The arrangement of FIG. 6 is substantially similar to the arrangement of FIGS. 4 and 5 except for the clamping adjustment and so will not be described in detail. The adjustment is by means of a bolt 50 extending through bores in ends 51 of the arms 52 and 53 which have engagement portions 52a and 53a respectively. The head of the bolt is welded to the arm 53 and is a clearance fit in the bore in the arm 52. A nut on the bolt between the two arms can be screwed into engagement with the arm 52 to force the two ends 51 apart and clamp the attachment on the brickwork. The bolt and nut form an extensible adjustment element.

The attachment of FIGS. 7 and 8 has an elongate cast iron securing member 60 of L-shaped cross section. As can be seen readily in the drawings, the arms of the L-shaped cross section are extended at the center and are provided on their outside face with pegs 61 which are relatively offset in the longitudinal direction along securing member 60. A pair of cast steel clamping arms 62, have a striplike portion 63 of swan necked configuration with a reinforcing web 64 and are provided with bores 65 extending from one side of the strip like portion 63 into the web 63. The bores 65 are of diameter slightly larger than the pegs 61 to enable the arms to be located on the pegs such that the arms are divergent, as shown in FIG. 8, while permitting a rocking or pivotting action thereon.

The remote ends of the mounted arms are chamfered or pointed to form a brick engaging claw portion 66. The other ends of the arms, to the other side of the bore 65 extend into an oppositely facing dispositon are provided with a bore 67 therethrough for locating an extensible adjustment element in the form of a square headed bolt 68 and a nut 69. The square headed bolt engages in a square sectioned recess on one opposite facing end which prevents its rotation, and the bolt extends through the bore 67 while the nut engages the other opposing face of the other arm. This arrangement can easily be seen from FIG. 8 from which it will be apparent that the bolt head is secured against rotation in the recess in the arm and by unscrewing the nut 69 with a spanner the two opposing faces of the arms are forced apart while the arm rocks or pivots on the pegs 61 while the claw portions 66 at the remote ends are moved relatively towards each other.

The securing member 60 in this embodiment is provided at each of its opposite ends with a support arm 70 suitable for receiving a device to be held on a structure e.g. a television aerial or cable trunking or conduit.

As can be clearly seen from FIG. 7, the offset relative disposition of the pegs 61 longitudinally of the securing member 60 results in the claw portions 66 being relatively offset. The claw portions are preferably offset by a distance equal to the depth of one brick.

In use for mounting for example a television aerial on a chimney stack, partly shown in FIG. 8 at 71, the securing member 60 is held on a corner of the stack in a position as shown in FIG. 8 one of the arms 62 e.g. the right hand arm as shown in the Figure is located on the peg 61 and the securing member 60 moved up or down the corner of the chimney until the claw portion 66 engages a joint between bricks and the claw end is hammered into the joint. The other arm 62 e.g. the left hand arm as shown in the Figure is now located on the other peg 61 and the claw end located in a joint between adjacent bricks. In this preferred embodiment due to the offset of the claw portions 66 the joint is located in the course below the course in which the first claw has been located but by suitable design of the arms, the two claws could be located in the same course or could be located in spaced apart courses. The claw end 66 is hammered into the joint. The bolt 18 with the nut secured thereon is now located as shown and the nut unscrewed with a spanner to force the two oppositely disposed faces of the arms apart and to cause the claw ends of the arms to move relatively towards each other thereby gripping the brickwork and securely mounting the brickwork attachment thereon. An aerial pole can now be secured to the support arms 70.

The embodiments of FIGS. 3 to 8 can be modified for the purpose of mounting on a face of a structure as opposed to a corner. For this, instead of being L-shaped in cross section the securing member would be flat as would be produced if the L-shaped arms were bent into alignment. In such an arrangement for the device of FIGS. 7 and 8 improved security may be effected by arranging that the pegs are convergent towards their free ends.

Figure 9:
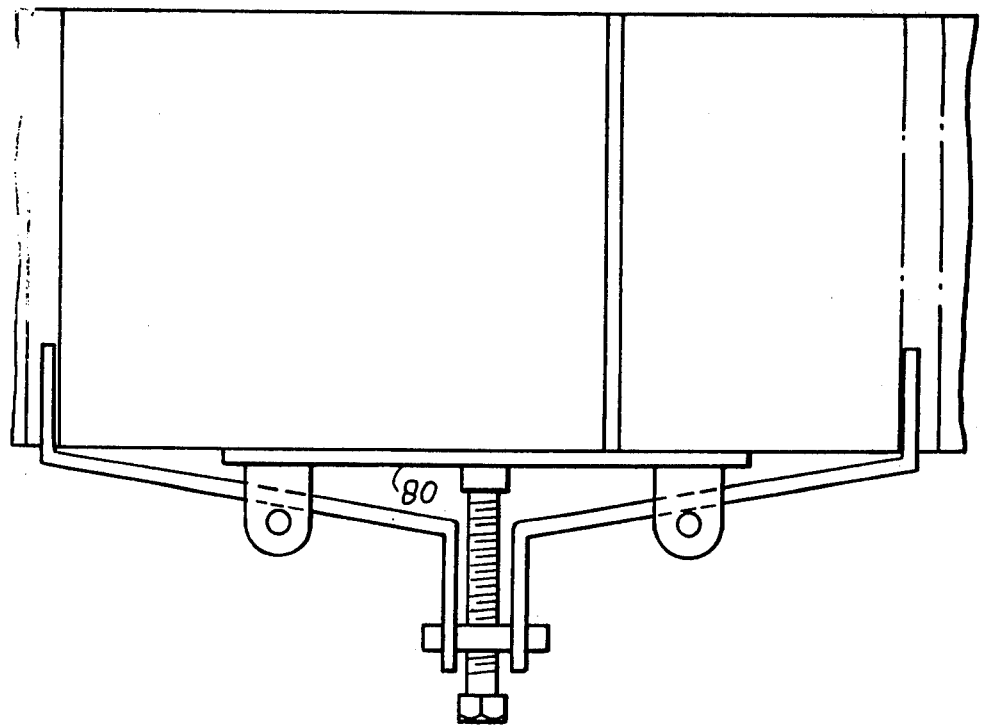
FIG. 9 is a further face mounting attachment constructed in accordance with the invention.

A modified form of the embodiment of FIG. 4 for mounting on a face of a structure is illustrated in FIG. 9, the securing member 80 being a flat plate version of the L-shaped portion of FIG. 4. The construction of this arrangement and its use for clamping on a flat face are substantially as described in relation to FIG. 4.

Each of the embodiments described can be provided either with engagement portions in alignment for engagement with crevices in the same course of bricks in the structure or can be offset to engage in crevices in different courses of the structure e.g. 1, 2 or 3 courses for example as illustrated in connection with FIG. 5. In the preferred arrangement where the engagement portions engage in different courses of bricks an improvement in rigidity of the clamping action is provided.

Although the engagement portions are preferably moved relatively towards each other to effect securement it is also possible to effect securement by movement of the engagement portions relatively apart.

The invention is suitable for fabrication in many different materials and by several different methods e.g. casting, moulding, pressing, or welding.

In a particularly economic form of embodiment for mounting on the corner of a brick structure the arms are of length equal to the width of a brick so that the brickwork attachment can be mounted across the ends of bricks in adjacent courses or across a half brick situated at the corner of the structure.

Alternatively, one arm may be longer than the other to grip one side face and one end face of a single brick.

In practice, it may be necessary to employ more elongated and sharper arm end or claw portions to ensure an adequate grip. This is particularly true of the form intended to grip on a single flat surface. Further, the clamping arms may be bent more abruptly so as to provide a more defined surface to hammer.

Although this specification speaks of 'brickwork', it is to be understood that a plain concrete or wooden surface can be grooved to receive the engagement of claw portions.

Although the attachment described is particularly useful in mounting television aerials onto brickwork it is envisaged that it will also find application mounting other devices e.g. street and industrial lighting appliances, trunking, retaining scaffolding against a wall to avoid internal retention through windows, supporting or small scaffolding platforms. In this respect, tests have shown that the attachment has considerable load bearing capability when clamped to the brickwork.

Although the device is particularly useful, as described above, for attachment to brick structures it can be employed on other block type structures. With structures having too few or no joints at all, the device may be used by boring holes into a wall or for example concrete or block construction the holes being relatively disposed for receipt of the engagement portions of the arms to enable clamping on the structure.

It will be understood that the above description of the present invention is susceptible to various modification changes and adaptations.

What is claimed is:

1. An attachment for a building structure comprising securing means shaped to locate on a corner of a structure, two arms supported by the securing means so as to extend divergently to permit location of the arms along adjacent faces of the structure to opposite sides of the corner, engagement portions at remote ends of the arms for engagement into a respective one of said adjacent faces of the structure and a single adjustment means operatively coupled with the arms and operable to effect sliding of the arms along said adjacent faces towards the corner to urge said engagement portion into clamping engagement with the structure.

2. An attachment in accordance with claim 1 comprising locating means on said securing means for slidably locating the arms on the securing means and to permit said sliding of the arms along said adjacent faces of the structure.

3. An attachment in accordance with claim 2, wherein the locating means comprises for each arm a retaining member spaced from and coupled with the securing member and adapted to permit slidable mounting of a respective one of said arms between the retaining member and the securing member.

4. An attachment in accordance with claim 3, wherein the retaining member is arranged as a fulcrum for the arms whereby said single adjustment means is operable to effect both sliding of the arms along said adjacent faces and rocking of the arms on the fulcrums to urge said engagement portions inwardly of the structure.

5. An attachment in accordance with claim 4, wherein the retaining members each comprise a rod secured between supports extending from the securing means.

6. An attachment in accordance with claim 4, wherein the ends of the arms opposite to said remote ends are adapted such that when supported by the securing means they extend into oppositely facing dispositions and said adjustment means comprises an extensible adjustment device connected between said ends opposite the remote ends.

7. An attachment in accordance with claim 1, wherein said adjustment means comprises an extensible adjustment device coupled between said securing means and each of said arms at opposite ends of the arms to said remote ends whereby extension of said adjustment device effects the sliding of said arms towards the corner.

8. An attachment in accordance with claim 7, wherein said adjustment means comprises a cross member in sliding engagement with the arms at the ends opposite said remote ends and a screw co-operating with a threaded hole in the cross member and extending in engagement between the cross member and the securing means to permit sliding of the arms towards the corner by adjustment of said screw.

9. An attachment in accordance with claim 1, wherein the securing member is of substantially "L" shaped cross section.

10. An attachment in accordance with claim 1, wherein said engagement portions are adapted to be relatively vertically offset when supported by the securing means on the corner of a structure.

11. An attachment in accordance with claim 10, for attachment to a brick structure, wherein said offset is substantially equivalent to the depth of at least one brick course for location of engagement portions in spaced apart joints between bricks in different courses of the brick structure.

12. An attachment for a building structure, comprising securing means shaped to locate on the corner of a structure two rods positioned one to each side of the corner engagement of the securing means and secured between supports extending from the securing means, two arms each slidably mounted between a respective one of said rods and the securing means in divergent disposition to permit location of the arms along adjacent faces of a structure to opposite sides of a corner, said arms being provided with engagement portions at remote ends of the arms for engagement into a respective one of the adjacent faces and having their opposite ends extending into oppositely facing disposition, a cross member in sliding engagement with the arms between said opposite ends and a screw co-operating with a threaded hole in the cross member and extending in engagement between the cross member and the securing means to permit sliding and rocking of the arms on the rods by adjustment of the screw to urge the engagement portions into clamping engagement with the structure.

* * * * *